US011718945B2

(12) United States Patent
Park

(10) Patent No.: US 11,718,945 B2
(45) Date of Patent: Aug. 8, 2023

(54) LAUNDRY TREATING APPARATUS HAVING CAMERA, AND CONTROL METHOD THEREOF

(71) Applicant: LG ELECTRONICS INC., Seoul (KR)

(72) Inventor: Yunsik Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 427 days.

(21) Appl. No.: 16/754,045

(22) PCT Filed: Aug. 5, 2019

(86) PCT No.: PCT/KR2019/009727
§ 371 (c)(1),
(2) Date: Apr. 6, 2020

(87) PCT Pub. No.: WO2021/025194
PCT Pub. Date: Feb. 11, 2021

(65) Prior Publication Data
US 2021/0404103 A1 Dec. 30, 2021

(51) Int. Cl.
*D06F 33/40* (2020.01)
*D06F 34/18* (2020.01)
(Continued)

(52) U.S. Cl.
CPC .............. *D06F 33/40* (2020.02); *D06F 34/18* (2020.02); *D06F 2103/02* (2020.02);
(Continued)

(58) Field of Classification Search
CPC ...... D06F 33/40; D06F 34/18; D06F 2103/02; D06F 2103/24; D06F 2105/48; D06F 2105/58; H04N 5/2257
See application file for complete search history.

(56) References Cited

U.S. PATENT DOCUMENTS

2013/0312202 A1* 8/2013 Balinski

FOREIGN PATENT DOCUMENTS

EP 2128324 12/2009
EP 2470711 B1 * 5/2017 ............. D06F 33/00
(Continued)

OTHER PUBLICATIONS

PCT International Application No. PCT/KR2019/009727, Notification of Transmittal of the International Search Report and the Written Opinion of the International Searching Authority, or Declaration dated May 1, 2020, 9 pages.
(Continued)

*Primary Examiner* — Michael E Barr
*Assistant Examiner* — Pallavi Chitta
(74) *Attorney, Agent, or Firm* — Lee Hong Degerman Kang & Waimey

(57) ABSTRACT

The present application relates to a laundry treating apparatus. More specifically, the present application relates to a laundry treating apparatus having a camera and a control method thereof. One embodiment of the present application provides a method including: causing a drum to move laundry inside the drum; generating time-series images of movement of the laundry by capturing an inside of the drum while the laundry moves over time; determining a movement state of the laundry based on the generated time-series images while the drum rotates at a revolutions per minute (RPM); controlling the RPM of the drum based on the movement state of the laundry to increase a laundry spread value; and after the laundry spread value has increased, increasing the RPM of the drum to perform a spinning process.

9 Claims, 7 Drawing Sheets

(51) Int. Cl.
  *D06F 105/48* (2020.01)
  *D06F 105/58* (2020.01)
  *D06F 103/02* (2020.01)
  *D06F 103/24* (2020.01)
(52) U.S. Cl.
  CPC ...... *D06F 2103/24* (2020.02); *D06F 2105/48* (2020.02); *D06F 2105/58* (2020.02)

(56) References Cited

FOREIGN PATENT DOCUMENTS

| | | | |
|---|---|---|---|
| GB | 2322141 | | 8/1998 |
| JP | 2014119279 A | * | 6/2014 |
| KR | 1020100115295 | | 10/2010 |
| KR | 1020130044764 | * | 5/2013 |
| KR | 1020160084698 | | 7/2016 |
| KR | 1020180049718 | | 5/2018 |
| KR | 1020190026517 | | 3/2019 |
| WO | WO-2018077251 A1 | * | 5/2018 ............. D06F 33/32 |

OTHER PUBLICATIONS

European Patent Office Application Serial No. 19853250.9, Search Report dated Jun. 30, 2021, 8 pages.

* cited by examiner (a)

(b)

Laundry spread value = high

LAUNDRY TREATING APPARATUS HAVING CAMERA, AND CONTROL METHOD THEREOF

CROSS-REFERENCE TO RELATED APPLICATIONS

This application is the National Stage filing under 35 U.S.C. 371 of International Application PCT/KR2019/009727, filed on Aug. 5, 2019, the contents of which are all hereby incorporated by reference herein in their entirety.

TECHNICAL FIELD

The present disclosure relates to a laundry treating apparatus. More specifically, the present disclosure relates to a laundry treating apparatus having a camera and a control method thereof.

BACKGROUND ART

There are many kinds of home appliances that receive and treat objects. That is, various kinds of home appliances may be provided depending on types of objects and manners of treating the objects.

Appliances that receive laundry and treat laundry may include a washing machine, a dryer, a styler (laundry treatment machine or a laundry manager). In this connection, the laundry may include various objects such as bedding, textile dolls, shoes as well as clothes worn by a user.

Treatment of laundry may include various treatments such as washing, drying, refreshing and sterilizing. A specific laundry treating apparatus may be specialized to a specific treatment process among various treatment processes. Alternatively, the laundry treating apparatus may be configured to perform a plurality of treatment procedures.

A washing machine may be configured such that a washing course in which washing and rinsing is performed using washing water is performed, and dehydration is performed via spinning. A dryer may be configured to perform a drying or refreshing course using hot air.

These laundry treating apparatuses have various treatment courses based on the types of objects. Each treatment course may include at least one or more sub-information.

The sub information includes control conditions of a driver or an actuator for performing a particular treatment course. For example, the washing machine may include control conditions such as the revolutions per minute (RPM) of a drum or pulsator, an actual operating ratio (on time of motor/total time (sum of off and on times of motor)), a water level (supply valve), and a temperature (heater).

Such home appliances may also be extended to a dishwasher for treating dishes or a cooking appliance for cooking food using ingredients. The object may be treated via various treatment courses depending on a type of the object to be treated such as a type of dishwasher or types of ingredients or depending on the intention of the user.

For home appliances including the laundry treating apparatus, a desired treatment course may be provided according to the type of the object or the treatment purpose of the object as described above. However, this requires the user to accurately input the type of object or treatment purpose into the laundry treating apparatus. In many cases, users will not know such information accurately. Even when the user knows the information, it may be difficult to correctly input such various information into the object treating apparatus. Thus, the object treating apparatus may not optimally treat the object.

Korean Patent Application Publication No. KR20130044764 (hereinafter, referred to as "prior patent 1") discloses a washing machine using a camera to detect laundry to extract the laundry information, and performing washing using the laundry information. Thus, even when the user does not recognize the type of the laundry correctly, the washing machine may provide the optimal treatment according to the type of the laundry. However, according to the washing machine according to prior patent 1, there is a problem that it is difficult to accurately recognize the type of the object via the camera, and the user has to manually place the object in front of the camera. Further, even when the washing machine performs object treatment based on the object information, there is a problem that it is not possible to guarantee that the object is optimally treated. This is because the camera may only extract the information of the object before the object treatment and may not detect whether the object is optimally treated during the object treatment.

Korean Patent Application Publication KR20160084698 (hereinafter, referred to as "prior patent 2") discloses a washing machine that may detect an abnormality based on an image obtained by photographing an inside of the washing machine using a camera. The camera may detect whether the door is opened or closed, whether laundry is spread or bubbles are generated. When the abnormal situation is detected, a washing machine may cope with this situation via the control of the driver. However, according to the washing machine disclosed in prior patent 2, only a method of detecting and dealing with the abnormal situation is presented. It is not possible to determine whether the object treatment is optimally treated because it is not an abnormal situation when the object treatment is normally performed. Thus, the driver control according to the abnormal situation is not followed. Therefore, prior patent 2 does not provide a scheme of providing whether the object is optimally treated and a scheme of controlling the apparatus such that the object is optimally treated.

Therefore, there is a need to provide household appliances (including a laundry treating apparatus) in which treatment of the object (laundry) may be optimally performed even when the user does not accurately recognize the information on the type of the object, the purpose of treatment of the object, or properties of the object (e.g., quality of the laundry, the moisture content, and stiffness).

DISCLOSURE

Technical Problem

The present disclosure aims to solve the problems of the home appliances (including conventional laundry treating apparatus) as described above.

A purpose of an embodiment of the present disclosure is to provide a laundry treating apparatus and a control method thereof, in which it may be determined whether an object is optimally treated based on time series information generated by a camera, and a driver or an actuator may be controlled to optimally treat the object using feedback information.

Another purpose of an embodiment of the present disclosure is to provide a laundry treating apparatus and a control method thereof, in which laundry spreading may be optimally performed for laundry load management prior to a main spinning process to facilitate start of the main spinning such that failure or delay of the start of the main spinning or excessive vibration may be prevented.

Another purpose of an embodiment of the present disclosure is to provide a laundry treating apparatus and a control method thereof, which may provide a current object treatment situation to a user using time series images or video information. In particular, a purpose of the present disclosure is to provide a laundry treating apparatus and a control method thereof, which may provide a user with information on an object treatment situation and evaluation information thereof. For example, the laundry treating apparatus and the control method thereof may provide treatment status information indicating that the laundry spreading is performed prior to entering the main spinning, evaluation information indicating that the laundry spread value is high, middle or low, feedback control information for increasing the laundry spread value, and evaluation information about the feedback control.

Another purpose of an embodiment of the present disclosure is to provide a laundry treating apparatus and a control method thereof, which may provide an augmented reality image or converted animation based on an object treatment situation such that the user may intuitively understand the current object treatment situation.

Technical Solutions

In order to achieve the above purposes, according to an embodiment of the present disclosure, a laundry treating apparatus and a method of controlling the same may be provided in which the laundry spreading is optimally performed based on an image generated by a camera and, then, starting a spinning process.

One embodiment of the present disclosure provides a method including: causing a drum to move laundry inside the drum; generating time-series images of movement of the laundry by capturing image of an inside of the drum while the laundry moves over time; determining a movement state of the laundry based on the generated time-series images while the drum rotates at a revolutions per minute (RPM); controlling the RPM of the drum based on the movement state of the laundry to increase a laundry spread value; and after the laundry spread value has increased, increasing the RPM of the drum to perform a spinning process.

A controller or processor may extract evaluation information matching the generated image information and perform the feedback control based on the evaluation information. A plurality of the evaluation information may be provided in a table form. A control logic corresponding to each evaluation information may be provided.

The method may further include displaying the time-series images on a display to a user. Accordingly, the user may view the time-series images or the video on the display.

The time-series images may be generated by capturing images of the inside of the drum at a first time interval and extracting discontinuous time-series images having a second time interval from the time-series images, wherein the second time interval is larger than the first time interval.

In another example, the camera may capture images of the inside of the drum at the second time interval to generate the discontinuous time-series images.

In this connection, the second time interval may be determined in consideration of a current drum RPM. For example, when the capturing time interval is the second time interval equal to a time duration for which the drum rotates by one revolution, a difference between generated images over time may be very small. Therefore, the movement state and spread state of the laundry may not be easily determined.

Thus, in one example, the camera captures the inside of the drum three times during the drum rotates by one revolution. Further, the camera captures an initial rotating section when the drum rotates by one revolution at a first time, then a middle rotating section when the drum rotates by one revolution at a second time, and then, a last rotating section of the drum when the drum rotates by one revolution at a third time. In either case, a current drum RPM should be taken into consideration to determine the capturing timing and time interval.

The method further includes transmitting the time-series images to an external terminal through a communication module. The time-series images or video information transmitted to the external terminal may be displayed on the external terminal in a non-modified manner. Therefore, the user may intuitively grasp the laundry treatment state or the state information of the laundry treating apparatus remotely if necessary.

The method further includes displaying a laundry spread value evaluation information related to the movement state of the laundry on a user interface, wherein the laundry spread value evaluation information is determined based on the time-series images. That is, it is highly likely that the user may not accurately recognize and determine the displayed information. Therefore, displaying the evaluation information about this information together with this information may provide more accurate information to the user.

The laundry spread value evaluation information includes a plurality of laundry spread value evaluation information. The method further includes extracting single evaluation information corresponding to a current laundry spread value among a plurality of laundry spread value evaluation information. The extracted evaluation information is provided to a user.

Each augmented reality image corresponding to each of the plurality of laundry spread value evaluation information is generated and displayed to a user for the user to intuitively determine a laundry spread state in the drum. The augmented reality image is superimposed on the displayed time-series images (preview image).

Each animation corresponding to each of the plurality of laundry spread value evaluation information is generated and displayed to a user for the user to determine a laundry spread state in the drum.

The animation is displayed in place of the time-series images (preview image).

The method further includes obtaining, via the user interface, RPM information of the drum for the feedback control from the user. That is, when the optimal laundry spread state is not achieved, the current state may be provided to the user and the user input may be requested.

Increasing of the laundry spread value is based on analyzing the RPM information of the drum input. Increasing of the laundry spread value may be executed based on a predefined control logic.

The method further includes re-extracting laundry spread value evaluation information after the feedback control, and providing the re-extracted information to the user. Therefore, the user may intuitively easily recognize that the evaluation information changes before and after the feedback control.

In order to achieve the above purpose, an embodiment of the present disclosure provides an apparatus including: a casing forming an appearance of the apparatus; a drum disposed inside the casing, wherein the drum accommodates laundry; a door disposed on the casing opening an inside of the drum; a camera disposed on the casing or the door, wherein the camera is configured to capture images of an inside of the drum while the laundry moves over time to generate time-series images of movement of the laundry; a motor for causing the drum to move the laundry inside the drum; and a processor configured to control the motor to perform a spinning process using a centrifugal force generated during the drum is rotating, wherein the processor is configured to: determine a movement state of the laundry based on the generated time-series images while the drum rotates at a RPM; control the RPM of the drum on based the movement state of the laundry to increase a laundry spread value; and after the laundry spread value has increased, increase the RPM of the drum to perform a spinning process.

Identifying the laundry movement state and increasing the laundry spread value may be performed in a predefined RPM range. That is, identifying the laundry movement state and increasing the laundry spread value may be performed in the laundry spread value increasing period. In this connection, the laundry movement state identification, evaluation and feedback control may be repeated a plurality of times. The RPM may increase or decrease in the feedback control.

After successfully and optimally performing an increase of the laundry spread value, the main spinning process at the high RPM may be performed by accelerating the drum RPM.

The laundry treating apparatus may include a communication module for transmitting image information to an external terminal. Therefore, the user may intuitively determine the laundry treatment state based on the image remotely on the external terminal.

Advantageous Effects

According to an embodiment of the present disclosure, a laundry treating apparatus and a control method thereof may be realized in which it may be determined whether an object is optimally treated based on time series information generated by a camera, and a driver or an actuator may be controlled to optimally treat the object using feedback information.

According to an embodiment of the present disclosure, a laundry treating apparatus and a control method thereof may be realized in which laundry spreading may be optimally performed prior to a main spinning process to facilitate start of the main spinning such that failure or delay of the start of the main spinning or excessive vibration may be prevented.

According to an embodiment of the present disclosure, a laundry treating apparatus and a control method thereof may be realized, which may provide a current object treatment situation to a user using time series images or video information. In particular, according to an embodiment of the present disclosure, a laundry treating apparatus and a control method thereof may be realized, which may provide a user with information on an object treatment situation and evaluation information thereof. For example, the laundry treating apparatus and the control method thereof may provide treatment status information indicating that the laundry spreading is performed prior to entering the main spinning, evaluation information indicating that the laundry spread value is high, middle or low, feedback control information for increasing the laundry spread value, and evaluation information about the feedback control.

According to an embodiment of the present disclosure, a laundry treating apparatus and a control method thereof may be realized, which may provide an augmented reality image or converted animation based on an object treatment situation such that the user may intuitively grasp the current object treatment situation.

Figure 1:
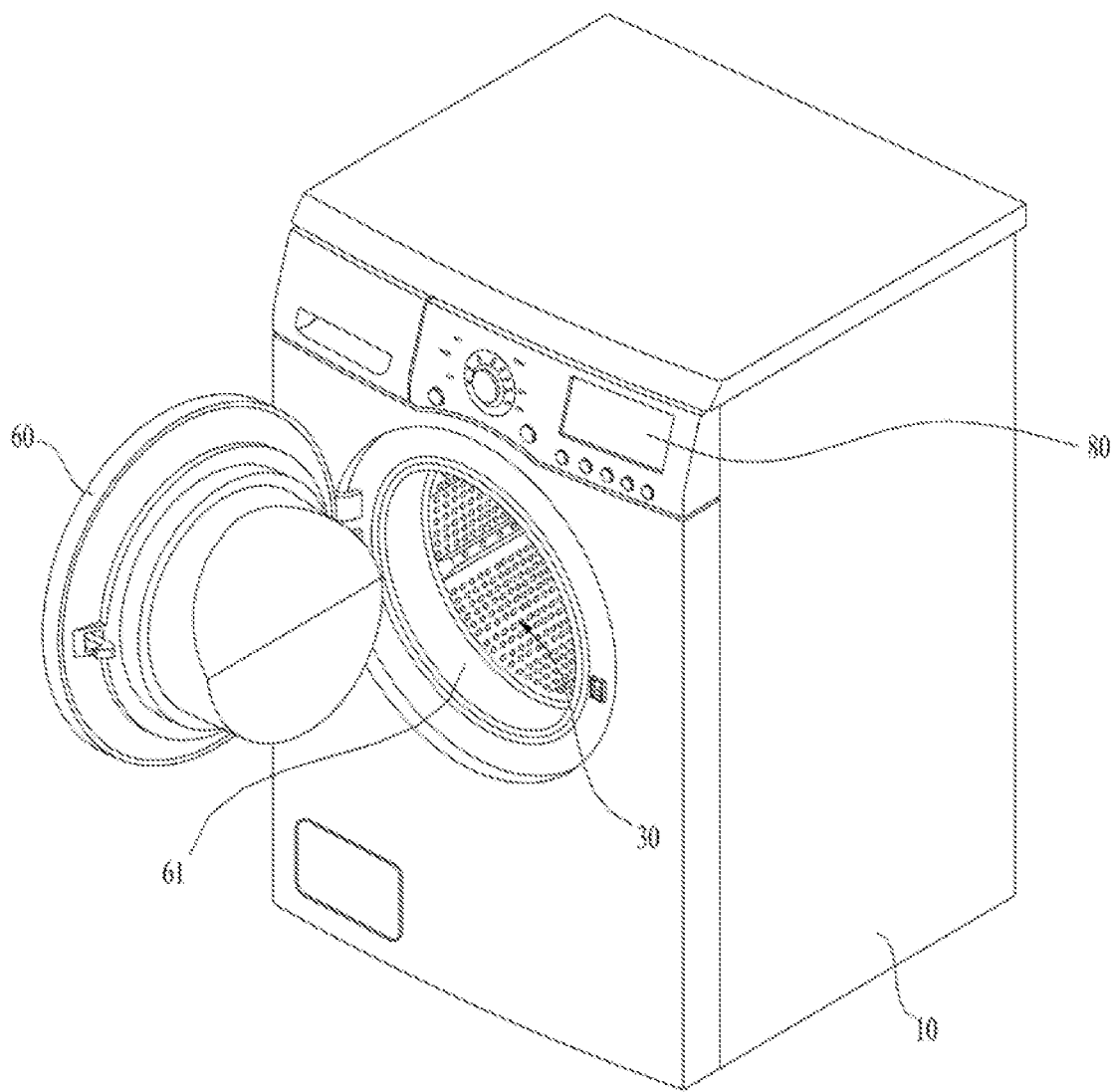
FIG. 1 shows an appearance of a laundry treating apparatus according to an embodiment of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

Hereinafter, a laundry washing apparatus and a control method thereof according to an embodiment of the present disclosure will be described in detail with reference to the accompanying drawings.

Hereinafter, a laundry washing apparatus according to an embodiment of the present disclosure will be described with reference to FIGS. 1 and 2.

FIG. 1 is a perspective view of an appearance of a washing machine according to an embodiment of the present disclosure. FIG. 2 is a cross-sectional view showing an interior of the washing machine according to an embodiment of the present disclosure.

The washing machine according to an embodiment of the present disclosure may include a cabinet 10 defining the appearance of a washing machine, a tub 20, a drum 30, and a door 60 configured for opening and closing the drum 30 to insert or remove laundry as a treatment object into or from the drum. Thus, the door may be configured to open and close an object inlet 61 of the cabinet 10.

The tub 20 is provided inside the cabinet 10 and configured to accommodate the drum 30. The drum 30 is rotatably disposed inside the tub 20 and holds laundry. An opening is provided in a front face of the drum 30 such that the laundry is put into the drum 30 through the opening.

A circumferential surface of the drum 30 has through holes 30h defined therein to move air and wash water between the tub 20 and drum 30.

Each of the tub 20 and drum 30 may be cylindrical. Thus, the inner and outer circumferential surfaces of each of the tub 20 and drum 30 may be substantially cylindrical. FIG. 2 shows a washing machine in which the drum 30 rotates about a rotation shaft parallel to a ground. In some embodiments, the drum 30 and tub 20 may have a tilting form inclined backwards.

The laundry washing apparatus further includes a driver 40 configured to rotate the drum 30 inside the tub 20. The driver 40 includes a motor 41. The motor 41 includes a stator and a rotor. The rotor may be connected to the rotation shaft 42. The rotation shaft 42 may be connected to the drum 30 to rotate the drum 30 inside the tub 20.

The driver 40 may include a spider 43. The spider 43 is configured to connect the drum 30 and the rotation shaft 42. The spider 43 may be configured to uniformly and stably transfer rotation force from the rotation shaft 42 to the drum 30.

The spider 43 is combined with the drum 30 while at least a portion of the spider 43 is inserted into a rear wall of the drum 30. To this end, the rear wall of the drum 30 is formed to be recessed inwardly of the drum. The spider 43 may be more convex inwardly of the drum 30 in a rotation center region of the drum 30.

The drum 30 receives a lifter 50 therein. A plurality of lifters 50 may be arranged along the circumferential direction of the drum 30. The lifter 50 performs a function of stirring the laundry. For example, the lifter 50 raises the laundry upwardly as the drum 30 rotates.

The laundry that is upwardly raised is separated from the lifter 50 due to gravity and falls downwardly. To that end, the laundry may be washed using an impact force caused by the laundry being repeatedly lifted and falling. Thus, the stirring of the laundry may improve the drying efficiency. The laundry may be evenly distributed back and forth within the drum 30. Therefore, the lifter 50 may extend from a rear end of the drum 30 to a front end thereof.

Figure 3:
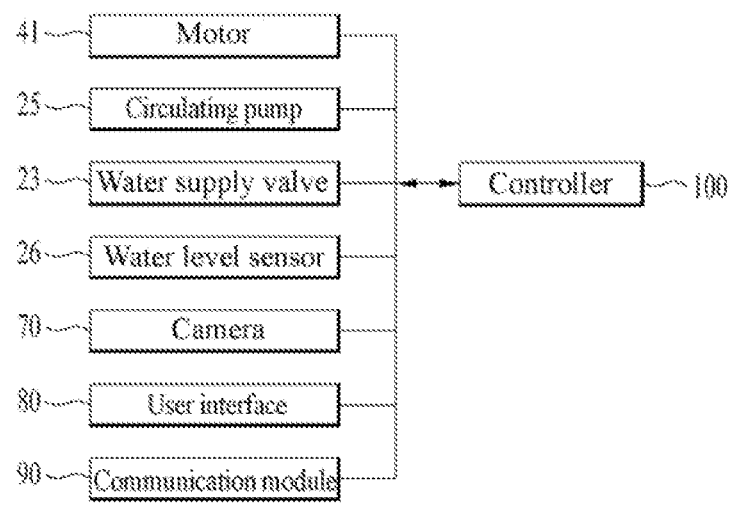
FIG. 3 shows a control configuration of a laundry washing apparatus according to an embodiment of the present disclosure.

FIG. 3 shows a control configuration of a laundry treating apparatus according to an embodiment of the present disclosure.

By default, the apparatus has a main controller 100 or processor which may be mounted inside a control panel. An operation of the laundry treating apparatus may be controlled by the processor.

The controller 100 may control operations of various hardware. The controller 100 controls the motor 41, a circulating pump 25, a water supply valve 23, a water level sensor 26, etc. for performing a washing course.

The laundry treating apparatus according to the present embodiment may include a user interface (UI) 80. The UI 80 may include various buttons and rotary knobs, and, in particular, may include a display. The user may input object treatment information to the laundry treating apparatus via the UI 80. In addition, the laundry treating apparatus may provide the user with object treatment information that the user inputs and is currently being performed on the UI 80.

In particular, the display may be implemented as a touch display. In this way, both the information input of the user and the information display of the laundry treating apparatus may be performed on the display.

The display may display letters, numbers or images thereon. As will be described later, time-series images, an augmented reality image, or animation may be displayed on the display. Accordingly, the user may intuitively grasp the current object treatment information and current situation of the laundry treating apparatus.

The laundry treating apparatus according to the present embodiment may include a communication module 90. The laundry treating apparatus may communicate with an external server through the communication module 90 to transmit and receive information therewith. The laundry treating apparatus may transmit/receive information with a user terminal through the external server.

In one example, the user may input a remote control command through an external terminal. Such a remote control command may be transmitted to the laundry treating apparatus through a server so that the laundry treating apparatus may be remotely controlled.

When a user remotely commands the laundry treating apparatus to perform laundry treatment, the laundry treating apparatus may transmit current state information to the server while performing the laundry treatment. The server may then send the information to the user's external terminal. Therefore, the user may easily understand the current laundry treatment information through the external terminal.

Figure 2:
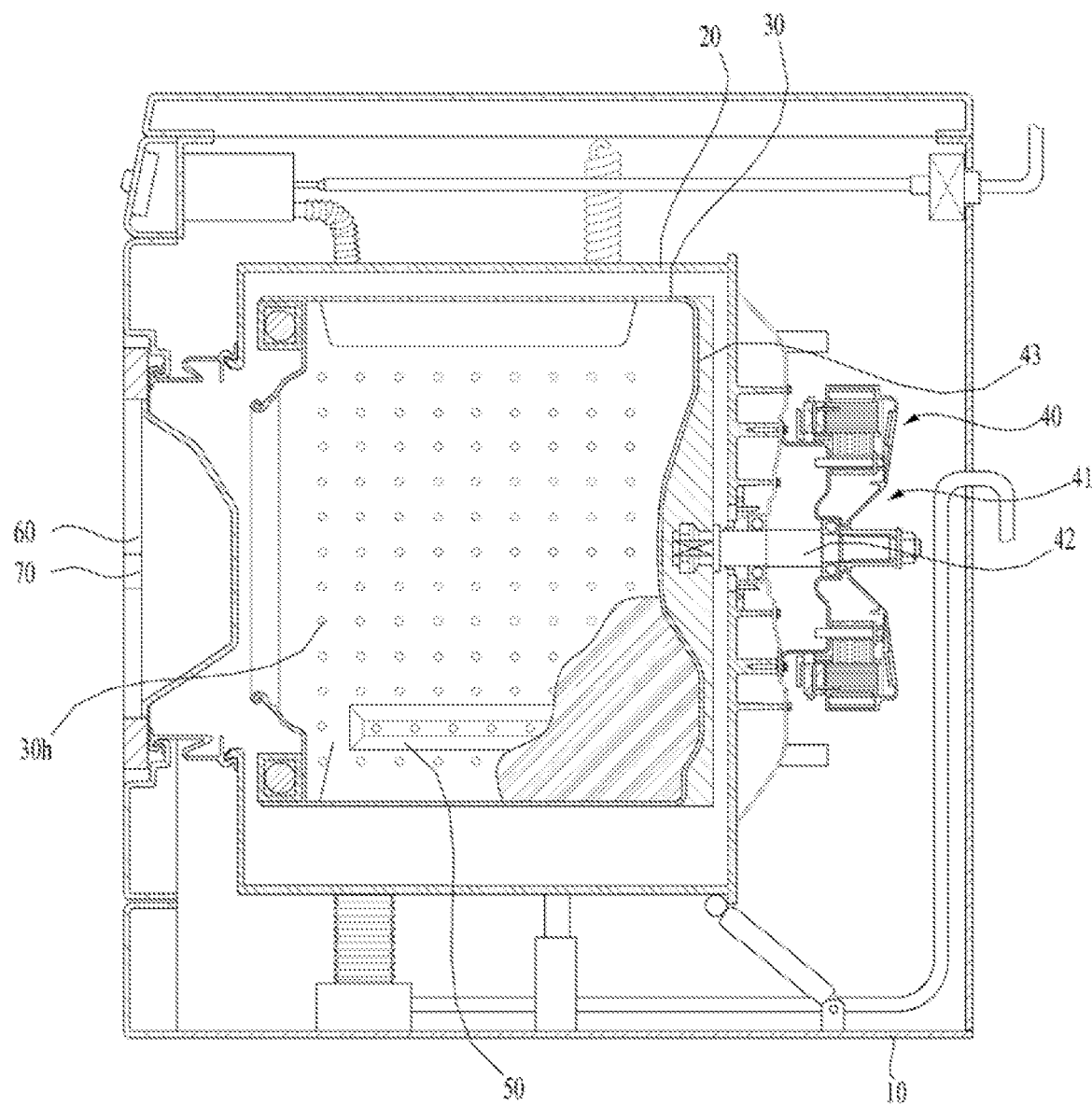
FIG. 2 shows a cross range of a laundry apparatus according to one embodiment of the present disclosure.

In this embodiment, as shown in FIG. 2, the apparatus may include a camera 70. The camera 70 may be provided at a door 60 to photograph the inside of the drum 30 such that movement of the laundry as an object in the drum 30 may be photographed by the camera 70. The camera 70 photography may then be used to generate image information or time-series images.

The image information may include a set of images continuously photographed for a predetermined time duration. As such, the user may understand the current drum rotating status and laundry movement status by viewing the image information displayed on the display.

The time-series images may be referred to as image information. However, when the drum rotates at a high speed (e.g., when the drum rotates at a spinning RPM beyond a tumbling RPM), the laundry will stick to the drum and rotate with the drum. During the spinning RPM, it is difficult for a user to intuitively determine the laundry movement state and the laundry spread state. Furthermore, it is difficult for a user to determine whether the laundry is properly moving inside the drum in an intended manner when washing or rinsing the laundry. To that end, it is difficult for a user to determine whether the laundry movement state is insufficient, proper or excessive while the drum is rotating because the user may not know what movement is currently intended for the laundry or how to interpret the movement.

Therefore, in some embodiments, the time-series images may be referred to as information generated at a second predetermined time interval larger than a first predetermined time interval between adjacent images that capture a time state for general image information. Such time-series images may be extracted from the image information. Such time-series images may be composed of images taken at the second predetermined time interval.

Therefore, when the time-series images are displayed on the display, the user may be able to view discontinuous moving images. These time-series images allow the user to intuitively understand the movement state or spread state of the laundry despite the user not being a designer or expert of a washing machine. As such, the user may more intuitively understand the laundry movement state or spread state based on a discontinuous time-series information instead of a continuous image information. In another example, these time-series images may allow the user to determine whether the laundry is moving or spreading in the laundry washing apparatus in an intended manner.

In some embodiments, the time-series images generated from the camera 70 may be used for effective object treatment.

The movement state of the laundry is very important when the laundry treating apparatus is washing, rinsing or spinning laundry because there is a preferred laundry movement state in which the laundry treating apparatus will optimally perform washing, rinsing and spinning.

In particular, the spinning may be referred to as a process of rotating the drum at a high speed to centrifuge water from the laundry. Therefore, it is preferable that a high-speed spinning is performed after the laundry has been evenly spread inside the drum. To that end, the laundry should be spread evenly inside the drum before performing high speed spinning. This is important in terms of vibration, noise prevention and system protection as achieved by eliminating abnormalities. This is also important for effective spinning because when the laundry is not properly spread, there may be a delay or failure in triggering the high-speed spinning. In this case, not only is the spinning not properly performed, but a total washing time also increases. Furthermore, the spinning may be incomplete, thereby causing deterioration of the spinning effect and deterioration of user satisfaction.

For at least these reasons, it is important to determine whether the laundry is properly spread before performing high speed spinning and to perform the high-speed spinning while the laundry is properly spread.

In some embodiments, the laundry spread state is determined by simply identifying an undesired state of the laundry treating apparatus due to the vibration or movement of the drum. Therefore, a frequency of the failures or delays in triggering the spinning inevitably increases, thereby to deteriorate the spinning quality.

However, in some embodiments, a laundry treating apparatus is provided to allow the user to easily and intuitively determine whether the movement of the laundry and whether the laundry spread are both occurring optimally. This information is similar to what a washing machine designer or developer would understand when they look directly at the movement of the laundry inside the drum. When the movement state of the laundry or the laundry spread state is not optimal, the movement of the laundry or the laundry spread may be performed via control of the driver or the actuator based on the feedback information. Therefore, washing or rinsing may be optimally performed.

Image information generated from the camera may be displayed on the UI 80. To that end, the user may intuitively understand the current state information of the laundry by viewing the displayed image information such as video information, characters and figures on the UI.

As described above, discontinuous time-series information may be displayed instead of continuous image information. The discontinuous time-series information allows the user to more intuitively understand the movement state of the laundry such that evaluation of the movement state of the laundry may be performed. Such evaluation information may be used for feedback control of the driver or actuator. In addition, the evaluation information may be displayed on the UI 80. The details thereof will be described later.

Hereinafter, a method of controlling a laundry treating apparatus according to an embodiment of the present disclosure will be described in detail with reference to FIGS. 4 and 5.

Figure 4:
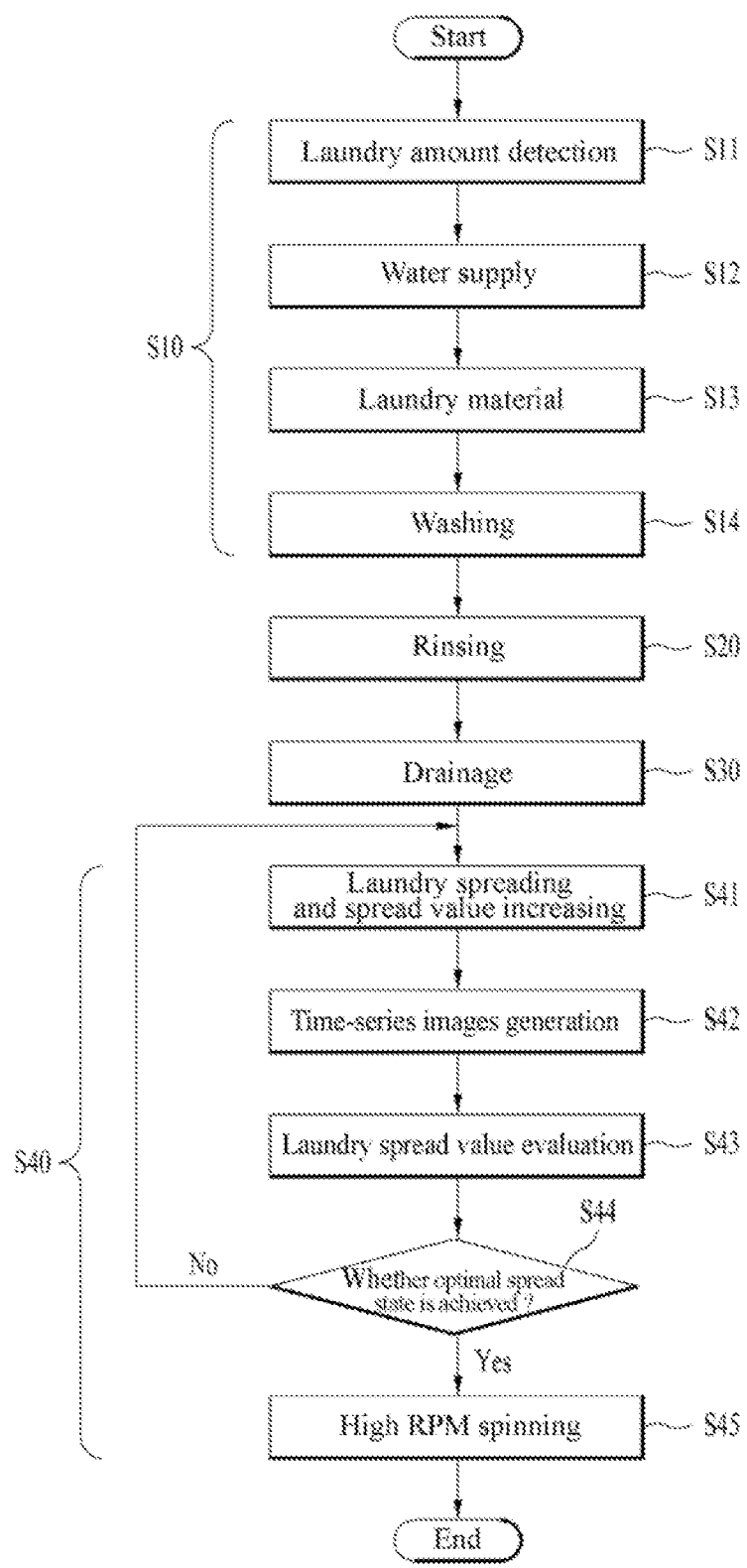
FIG. 4 shows a control flow of a laundry washing apparatus according to an embodiment of the present disclosure.

FIG. 4 shows control flow steps according to an embodiment of the present disclosure. FIG. 5 shows specific images that are created in a spinning process and corresponding time points at which the specific images are created according to an embodiment of the present disclosure.

According to this embodiment, the image information or time-series information obtained using a camera may be used in a spinning process S40. The image or information generated in the spinning process may be used to determine whether the spinning is being performed smoothly or is to be performed smoothly such that the user may understand the movement or spread state of the laundry. To perform optimal spinning, the movement or spread state of the laundry may be used to facilitate the movement or spread enhancement of the laundry. More specifically, when spreading the laundry and rotating the drum at a relatively low RPM before a high-speed spinning, a main spinning process begins and image information or time-series information may then be generated using the camera to perform an optimal laundry spreading and then trigger the main spinning.

The spinning process S40 may begin with a laundry spreading and laundry spread enhancement step S41. The laundry spreading step may include removing laundry entanglements in order to spread the laundry evenly inside the drum by rotating the drum at a relatively low RPM. At this time, the drum may rotate at a tumbling rotation of 40 to 50 RPM. The drum rotates to remove the laundry entanglement and also spread the laundry based on the laundry repeatedly rising up and falling down.

The apparatus may perform a motion to enhance the laundry spread state at an RPM higher than the tumbling rotation RPM. At this time, the drum and the laundry rotate integrally at about 100 RPM.

Figure 5:
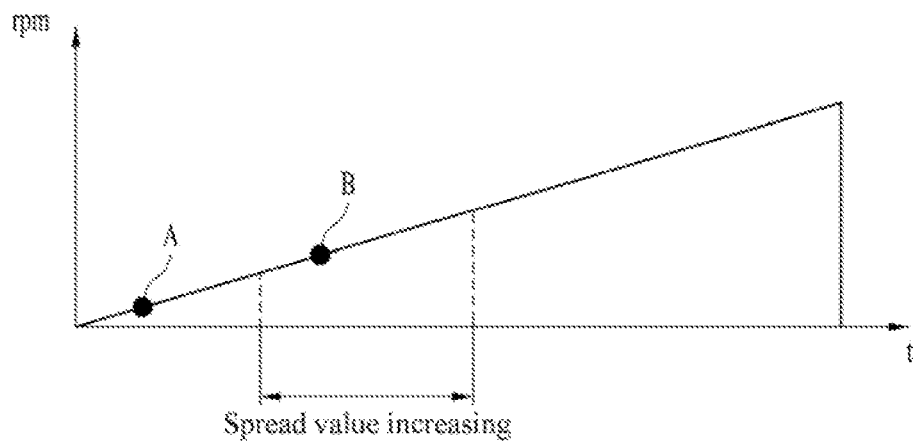
FIG. 5 shows an example of an image information acquisition time and acquired image information during a spinning process.
Figure 5:
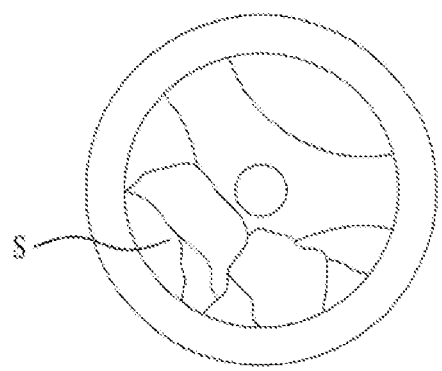
Figure 5:
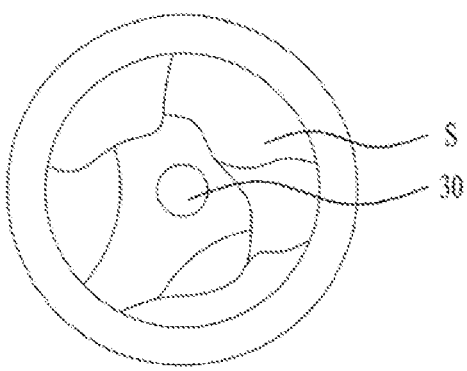

FIG. 5 shows an (a) image generated at a time point A (tumbling driving time) in a spinning process and (b) an image generated at a time point B (spin driving time in the laundry spread enhancement step) in the spinning process.

In another example, these images may be generated and displayed as a moving image. However, a plurality of still images may be used in a time-series manner for the controller 100 or processor to determine the laundry movement state or the laundry spread state. That is, the controller 100 or processor may determine whether the laundry is optimally moved or spread based on the time-series images.

Therefore, the controller may determine whether the entangling of the laundry has been removed while performing the laundry spreading step. While performing the laundry spread enhancement step S41, the controller may determine whether the laundry is properly spread. For this determination, the time-series information may be generated S42. Evaluation information may be generated based on the generated time-series information. That is, the evaluation of the laundry spread value or the laundry movement state may be performed. A plurality of the evaluation information may be provided. The controller 100 may analyze the generated time-series images and extract matching evaluation information among the plurality of evaluation information.

For example, when the optimal laundry movement state or the laundry spread state is determined to be at a "high" level, the evaluation information may be displayed as "high". In another example, there is no limit to express the laundry spread value and the number of the laundry spread values.

The controller 100 generates the evaluation information based on the time-series information and performs feedback control based on the evaluation information.

Among the control variables for the spinning, the most dependent variable on laundry movement state and laundry spread value may be a drum RPM. Therefore, in this embodiment, a variable to be feedback-controlled may be the drum RPM.

When the evaluation information indicates that the laundry spread value is at a "medium" or "low" level, the drum RPM may be feedback-controlled to be lower than a current value. Then, the laundry spread enhancement step S41 is performed using the feedback-adjusted drum RPM. The time-series information generation and laundry spread value may be evaluated repeatedly.

When the evaluation information indicates that the laundry spread value is at a "high" level, the controller may feedback-control the drum RPM to be higher than the current value. The laundry spread may be determined to be optimally maintained based on the feedbacked drum RPM.

Thus, the feedback control to increase the drum RPM is performed when the laundry spread state is good. To the contrary, the feedback control to lower the drum RPM is performed when the laundry spread state is good. This may obtain the optimal laundry spread value.

When the optimal laundry spread value is obtained, the controller may increase the drum RPM gradually to perform the high-speed spinning. In this case, the drum RPM at the high speed spinning may be about 1000 RPM or greater.

The laundry spread enhancement step S41 and the time-series information generation time will be described in detail with reference to FIG. 5.

Triggering of the high speed spinning is carried out after the laundry is evenly spread in the drum and is closely centrifuged to the drum. Therefore, the spread value of laundry before triggering the high speed spinning is preferably determined in the spin RPM range. In other words, the laundry spread value is preferably determined in an RPM range in which the laundry closely adheres to the drum and rotates therewith.

Therefore, although the time-series images may be generated in the tumbling driving time, it is preferable that the time-series images are generated in the spin RPM range.

In some embodiments, the spin RPM range may be about 80 to 120 RPM, and may be extended up to around 200 RPM. In this case, the spin RPM range may not be a simple drum RPM range but may be defined by upper and lower threshold points of the drum RPM that are feedback-controlled to facilitate the laundry spreading. Therefore, the spin RPM range may be referred to as a laundry spread enhancement range or a feedback control range.

After driving the drum in a tumbling manner, the drum RPM may increase to enter the feedback control range. As the drum RPM enters the feedback control range, the time-series images information is generated with the camera. The laundry spread value may then be evaluated using the time-series images information.

Based on the laundry spread value evaluation result, the controller 100 may increase or decrease the drum RPM in a feedback controlling manner. Once the laundry spread value is satisfied, the controller may perform feedback control to gradually increase the drum RPM. At the same time, the laundry spread value may be evaluated and reflected repeatedly. In another example, the drum RPM may be lowered again when the laundry spread value decreases while increasing the drum RPM.

Therefore, the laundry spreading may be optimally performed by increasing or decreasing the drum RPM in the feedback control range without stopping the drum.

When the feedback control is successfully performed, the controller may further increase the drum RPM to enter the high-speed spinning mode for performing high speed spinning.

In one example, as shown in FIG. 4, the spinning process S40 may be performed independently and may also be performed as a portion of the washing course. That is, a single washing course may be composed of the washing process S10, the rinsing process S20, and the spinning process as performed. Each drainage process may be performed between the washing process S10 and rinsing process S20 and between a plurality of rinsing processes. When the rinsing process S20 is completed, the drainage may be finally performed. The spinning process S40 may be performed after the final drainage S30 is terminated.

The washing process S10 may begin with performing a laundry amount detection S11. In another example, a course input step and a start input step may be performed first, and, then, the laundry amount may be detected while rotating the drum.

In some embodiments, the laundry amount detection S11 may be performed to determine an approximate load amount corresponding to the laundry amount. As the amount of laundry to be treated increases, the amount of washing water or the time required for the washing course may be increased for optimal laundry treatment.

When the laundry amount is detected S11, the laundry soaking may be performed while a water supply S12 is performed. The water supply S12 may be performed a plurality of times. A water supply after an initial water supply may be referred to as an additional water supply. When the additional water supply is finished, the water supply and laundry soaking may end, and, then, the main washing S14 may be performed.

Even when laundry has the same weight and the same volume, a laundry material is very important in the actual laundry treatment. This is because the main purpose of laundry treatment is to improve a washing power of the laundry, but it is also important to avoid damage to the laundry during washing.

In addition, a water content needed for laundry treatment may also vary greatly depending on the laundry material. Therefore, when loads of laundry have the same laundry amount, laundry with a higher moisture content and laundry with a lower moisture content may require different optimum amounts of water supplies thereto. An insufficient water supply is disadvantageous in terms of sufficient laundry wetness or detergent dissolution. Excessive water supply is detrimental to detergent concentration. Therefore, it is important to accurately detect the laundry material in order to provide an optimum supply of water during laundry treatment.

For example, a knit made of a wool is more sensitive to laundry damage due to a high water content and softness thereof. A blue jean made of a cotton is less susceptible to laundry damage due to a relatively low moisture content and stiffness thereof.

Therefore, it may be very important to determine laundry material which distinguishes between soft laundry and stiff laundry because, for the soft laundry, the damage reduction of the laundry may have a higher priority than improving the washing power.

To this end, the laundry material detection may be performed before the water supply and laundry soaking process. The laundry material may also be determined based on a correlation between the laundry amount detected before the water supply and the water supply amount.

The washing water level in the tub may vary even when the same laundry amount and the same water supply amount are detected. As an example, for laundry with high moisture content, the water level of the washing water is lowered.

However, the laundry material detection based on the above scheme generally may only acquire laundry material information related to the water content, and may not obtain laundry material information related to a softness or stiffness value of the laundry. Therefore, laundry treatment control variables are set based on laundry material information related to the moisture content, and the laundry treatment is performed based on the variables. However, the laundry treatment may not be performed based on the laundry material information related to the softness or stiffness value of the laundry.

In the above description, the embodiment of the laundry treating apparatus and the control method thereof in which optimal spinning may be performed based on the time-series images information has been described. The embodiment of the laundry treating apparatus and the method of controlling the same in which the optimal spinning may be performed as a portion of the washing course has been described.

Hereinafter, another embodiment of the present disclosure will be described in detail with reference to FIGS. 6 and 7.

This embodiment may be similar to the above-described embodiment. However, FIGS. 6 and 7 show an added feature in which the time-series images information or evaluation information is converted into display information. Therefore, repeated description of the same content therebetween is omitted.

Figure 6:
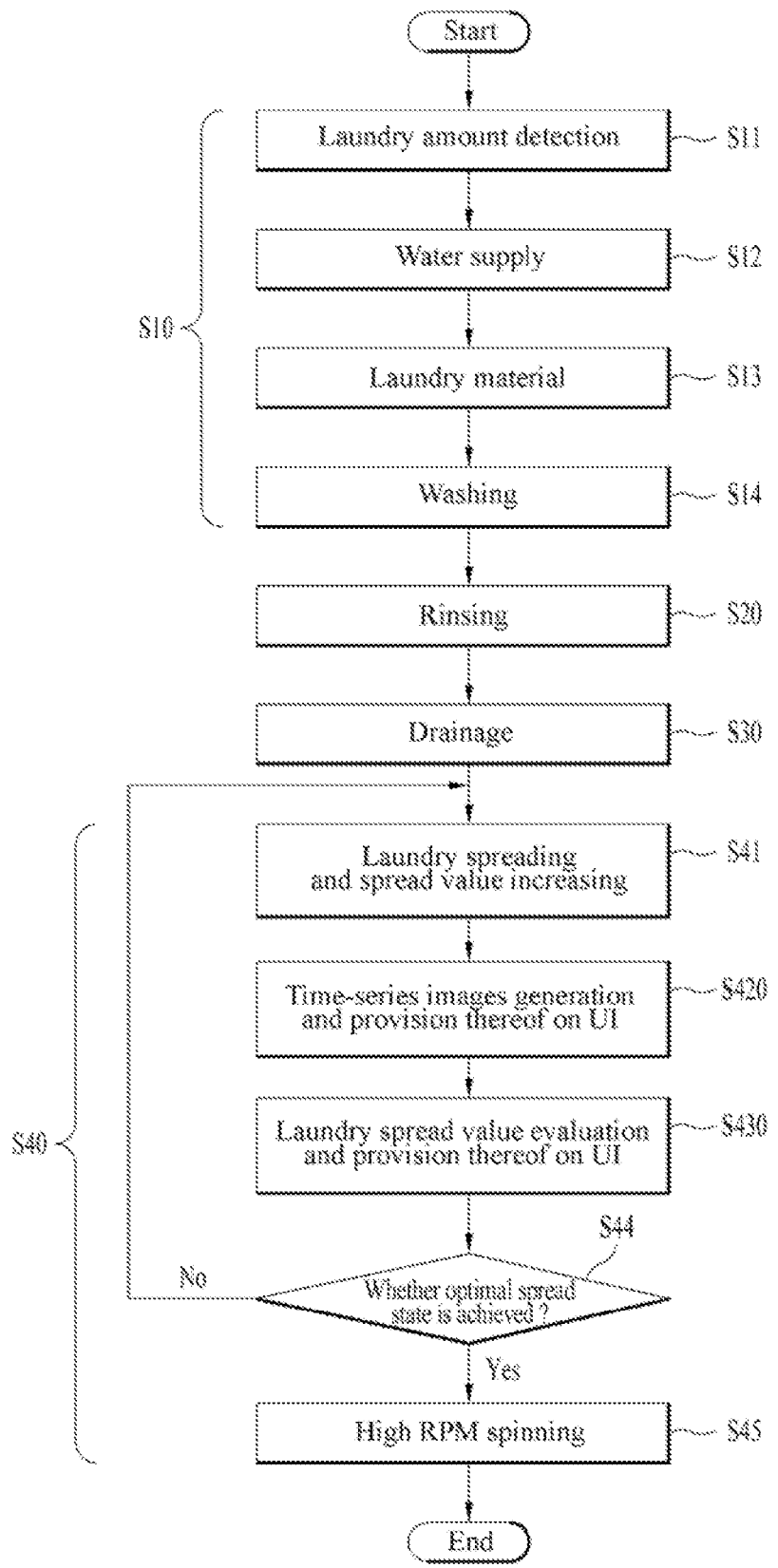
FIG. 6 shows a control flow of a laundry washing apparatus according to another embodiment of the present disclosure.

As shown in FIG. 6, at a step S420, time-series information generation is performed and the generated time-series information is displayed on the UI.

Even when the camera is provided and the laundry is optimally treated using the camera, the user may question how the camera is used and why the camera is needed. Therefore, it is necessary to provide a laundry treating apparatus that increases user satisfaction by providing the generated image directly to the user.

The treatment of the laundry is carried out while the laundry or drum is moving and not fixed. In particular, it is very important to know how the laundry moves with respect to the drum. When a laundry machine designer or developer may evaluate laundry movement by simply observing the actual spinning of the laundry, but it is difficult for an everyday user or a layman to evaluate the laundry movement by observing the actual spinning.

Therefore, although the actual movement image or discontinuous time-series images of the laundry may be provided to the user, it is not easy for the user to evaluate the movement based on the provided image.

Therefore, an image obtained by converting the actual image or time-series images, an augmented reality image, or animation may be provided to the user. The provided information may be displayed on the UI 80.

Figure 7:
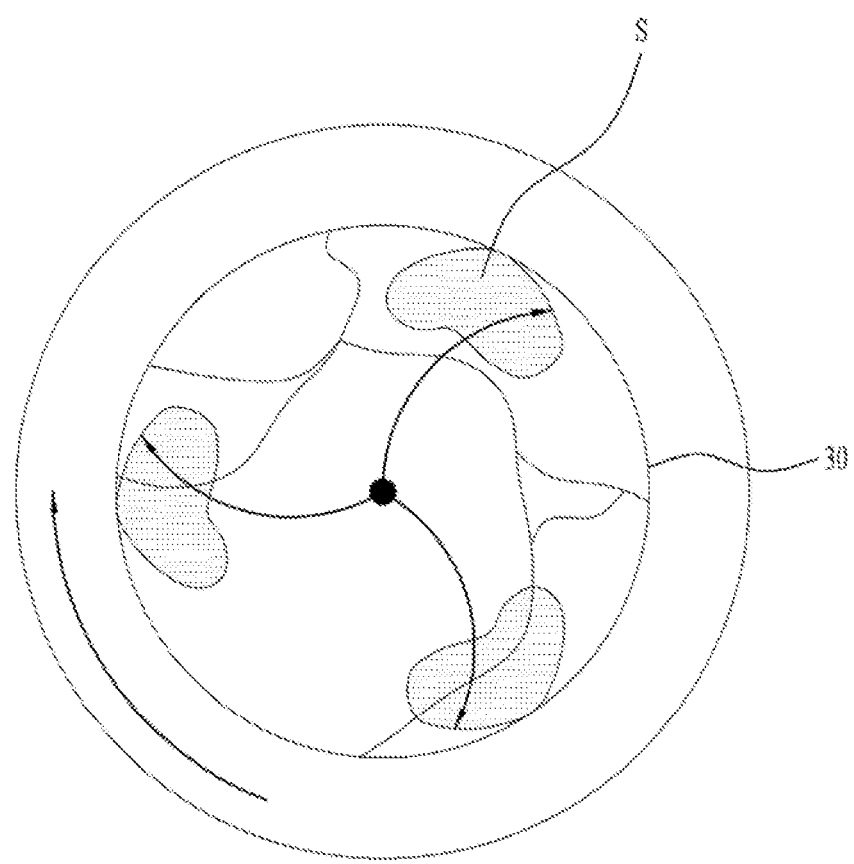
FIG. 7 shows an example of converting and displaying generated image information.

FIG. 7 shows an example in which an augmented reality image or animation is displayed on an actual image or time-series images according to an embodiment of the present disclosure.

A preview video or image may be displayed. In other words, the augmented reality image may be displayed in an overlapping manner as shown in FIG. 7. This allows the display to intuitively display the laundry spread state using the drum 30 and laundry S. The drum 30 and laundry S may be displayed as rotating. In another example, it is desirable to allow the drum 30 and laundry S to rotate at a slow speed so that the user may intuitively identify and evaluate the movement state of the laundry.

In one example, in the augmented reality or animation, the drum 30 and laundry S may rotate integrally, and the laundry S may be evenly spread inside the drum and centrifuged to the drum. Thus, the user may intuitively know that the laundry spreading is optimally performed.

Further, in one example, a portion of the laundry S may be biased to one side of the drum and rotate together with the drum causing an uneven laundry spread. Thus, the user may intuitively understand that the laundry spread state needs to be improved. In addition, the augmented reality or animation may display the drum and laundry as vibrating.

The preview video or image may also be replaced with animation. For example, when the preview video or image shown in FIG. 7 is omitted, this may be referred to as animation.

In addition, the display displays the actual image, augmented reality image or converted animation. In some embodiments, the evaluation information may be displayed on the display.

That is, a step S430 may be provided to provide the evaluation information determined by the controller 100 on the UI 80. The provided evaluation information may be displayed on the UI 80.

The user may intuitively recognize the image information and evaluation information on the display. The user may appreciate that the feedback control is performed to perform an optimal laundry treatment using the camera. In particular, information on whether feedback control is being performed, image information after the feedback control, and evaluation information after the feedback control may be displayed on the display. Accordingly, the user may intuitively and clearly recognize that the laundry treating apparatus is optimally treating the laundry with the camera. As a result, the laundry treating apparatus and the control method thereof may be realized that may provide an optimal laundry treatment and at the same time, provide a user with confidence and satisfaction.

In one example, at least one of the image information, time-series images information, augmented reality image, animation, or evaluation information may be transmitted to an external terminal through the communication module. As such, the external terminal of the user may also act as an extended UI.

The user may also view real time video information on the external terminal. In another example, the real-time image information or video information may be viewed only when necessary.

In one example, as described above, the above information may be transmitted to the external terminal only when the feedback control based on the image information or time-series images information is required. The user may be informed of change in the laundry movement state before and after the feedback control.

The image information and evaluation information about a condition where the laundry spread state is determined to be undesirable may be transmitted to the external terminal of the user. Then, the user may be requested to input a remote control. For example, the user may be requested to input whether the drum RPM is increased or decreased in order to satisfy the laundry spread value. After the feedback control is performed in response to the user's input, the user may be informed of the change in the laundry movement state before and after the feedback control.

Therefore, the user may control the laundry treating apparatus while watching the laundry treating apparatus and, at the same time, may feel the satisfaction of the laundry treatment.

INDUSTRIAL APPLICABILITY

Industrial applicability of the present disclosure has described in the Detailed Description section.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first image could be termed a second image, and, similarly, a second image could be termed a first image, which changing the meaning of the description, so long as the occurrences of the "first image" are renamed consistently and the occurrences of the "second image" are renamed consistently. The first image and the second image are both images, but they are not the same image.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
causing a drum to move laundry inside the drum;
generating time-series images of movement of the laundry by capturing images of an inside of the drum while the laundry moves over time;
determining a movement state of the laundry based on the generated time-series images while the drum rotates at a defined revolutions per minute (RPM);
analyzing the generated time-series images to determine a current laundry spread value related to the movement state of the laundry;
determining, based on the time-series images, laundry spread value evaluation information related to the movement state of the laundry, wherein one of the laundry spread value evaluation information includes the current laundry spread value;
displaying the laundry spread value evaluation information on a display to a user;
controlling the RPM of the drum based on the movement state of the laundry to achieve a first laundry spread value from among a plurality of values; and
after the first laundry spread value is achieved, increasing the RPM of the drum to perform a spinning process,
wherein displaying the laundry spread value to the user comprises:
generating an augmented reality image corresponding to each of the laundry spread value evaluation information; and
displaying, on the display, the augmented reality image of each of the laundry spread value evaluation information to permit the user to determine a laundry spread state in the drum.

2. The method of claim 1, further comprising displaying the time-series images on the display.

3. The method of claim 2, wherein the time-series images are generated by capturing images of the inside of the drum at a first time interval and extracting discontinuous time-series images having a second time interval from the time-series images, wherein the second time interval is larger than the first time interval.

4. The method of claim 1, further comprising transmitting the time-series images to an external terminal through a communication module.

5. The method of claim 1, further comprising:
displaying, on the display, the time-series images and each of the augmented reality images superimposed on the displayed time-series images.

6. The method of claim 5, further comprising:
displaying, on the display, an animation corresponding to each of the laundry spread value evaluation information to illustrate the laundry spread state in the drum.

7. The method of claim 1, further comprising obtaining, via a user interface, RPM information of the drum for feedback-control from the user.

8. The method of claim 7, wherein the laundry spread value is increased based on analyzing the RPM information of the drum.

9. The method of claim 8, further comprising re-extracting laundry spread value evaluation information after the feedback-control, and providing the re-extracted information to the user.

* * * * *